Q USOO8274785B2

(12) United States Patent
Chen et al.

(10) Patent No.: US 8,274,785 B2
(45) Date of Patent: Sep. 25, 2012

(54) ELECTRONIC APPARATUS WITH DRIVE BRACKET

(75) Inventors: Yun-Lung Chen, Taipei Hsien (TW); Gang Su, Shenzhen (CN); Xiao-Wen Duan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 246 days.

(21) Appl. No.: 12/841,429

(22) Filed: Jul. 22, 2010

(65) Prior Publication Data

US 2011/0261512 A1 Oct. 27, 2011

(30) Foreign Application Priority Data

Apr. 26, 2010 (CN) .......................... 2010 1 0155715

(51) Int. Cl.
*G06F 1/16* (2006.01)
(52) U.S. Cl. ................................................. 361/679.33
(58) Field of Classification Search ............... 361/679.33
See application file for complete search history.

(56) References Cited

U.S. PATENT DOCUMENTS

| 5,995,364 | A  | * | 11/1999 | McAnally et al. | ........ 361/679.31 |
| 6,530,551 | B2 | * | 3/2003  | Gan             | ............... 248/694 |
| 6,644,762 | B1 | * | 11/2003 | Chen            | ........... 312/223.2 |
| 6,714,409 | B2 | * | 3/2004  | Chen            | ........... 361/679.33 |
| 6,744,626 | B2 | * | 6/2004  | Chen et al.     | ............. 361/679.33 |
| 6,781,827 | B2 | * | 8/2004  | Goodman et al. | ........ 361/679.58 |
| 6,781,841 | B2 | * | 8/2004  | Kim et al.      | ..................... 361/724 |
| 6,801,427 | B2 | * | 10/2004 | Gan et al.      | ................. 361/679.33 |
| 6,862,174 | B2 | * | 3/2005  | Chien et al.    | ............. 361/679.33 |
| 6,999,310 | B1 | * | 2/2006  | Lai             | ............. 361/679.33 |
| 7,237,854 | B2 | * | 7/2007  | Chen            | ........... 312/223.2 |
| 7,643,280 | B2 | * | 1/2010  | Chen            | ........... 361/679.33 |
| 8,054,621 | B2 | * | 11/2011 | Chang           | ..................... 361/679.37 |
| 2007/0019376 | A1 | * | 1/2007 | Zhang          | ........................ 361/685 |

* cited by examiner

*Primary Examiner* — Lisa Lea Edmonds
(74) *Attorney, Agent, or Firm* — Altis Law Group, Inc.

(57) ABSTRACT

An electronic apparatus includes a first drive bracket and a second drive bracket. The first drive bracket includes a bottom plate. The bottom plate defines a receiving groove and an arc-shaped sliding groove. The second drive bracket includes a top wall. The top wall includes a knob and at least one sliding member formed thereon. The knob is received in the receiving groove to work as an axis. The at least one sliding member is received in the sliding groove, and capable of sliding in the sliding groove to a mounted position. In the mounted position, the top wall of the second drive bracket is aligned with the bottom plate of the first drive bracket.

20 Claims, 4 Drawing Sheets

ELECTRONIC APPARATUS WITH DRIVE BRACKET

BACKGROUND

1. Technical Field

The present disclosure relates to electronic apparatuses, and more particularly, to an electronic apparatus equipped with drive brackets.

2. Description of Related Art

The manufacture and assembly of electronic apparatuses has become increasingly more competitive. Manufacturers continually strive to improve the design and features of electronic apparatuses, and yet still offer competitive prices. One such area of improvement is mounting of devices in an electronic apparatus. An electronic apparatus, such as a typical desktop computer, tower, or server, usually includes drive brackets to mount disk drives, such as hard disk drives, compact disk read-only memory (CD-ROM) drives, digital videodisc (DVD) drives, and floppy disk drives. These devices are typically added to increase the functionality of the electronic apparatus as desired by a user. However, when all of the drive brackets are filled with disk drives, new disk drives cannot be mounted in the electronic apparatus.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
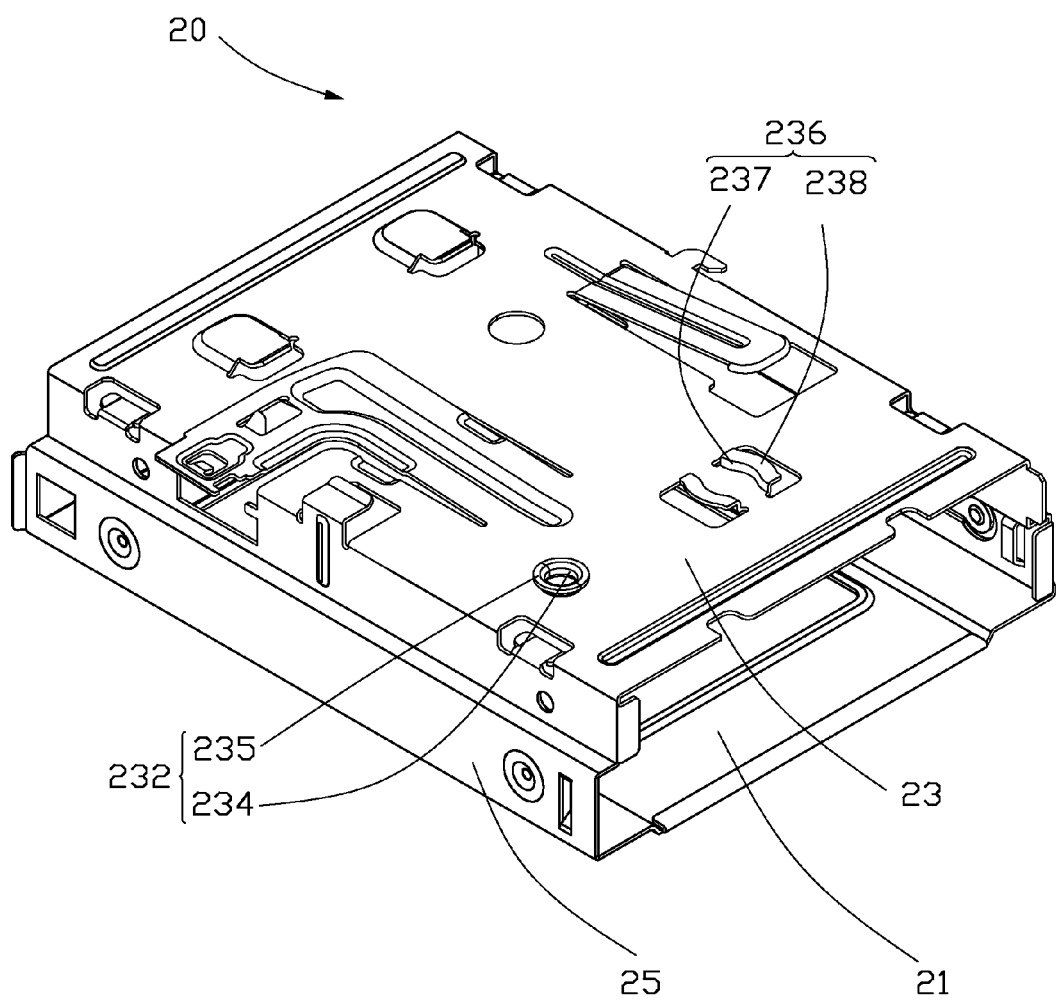
FIG. 1 is an isometric view of a drive bracket of an electronic apparatus in accordance with an embodiment.
Figure 2:
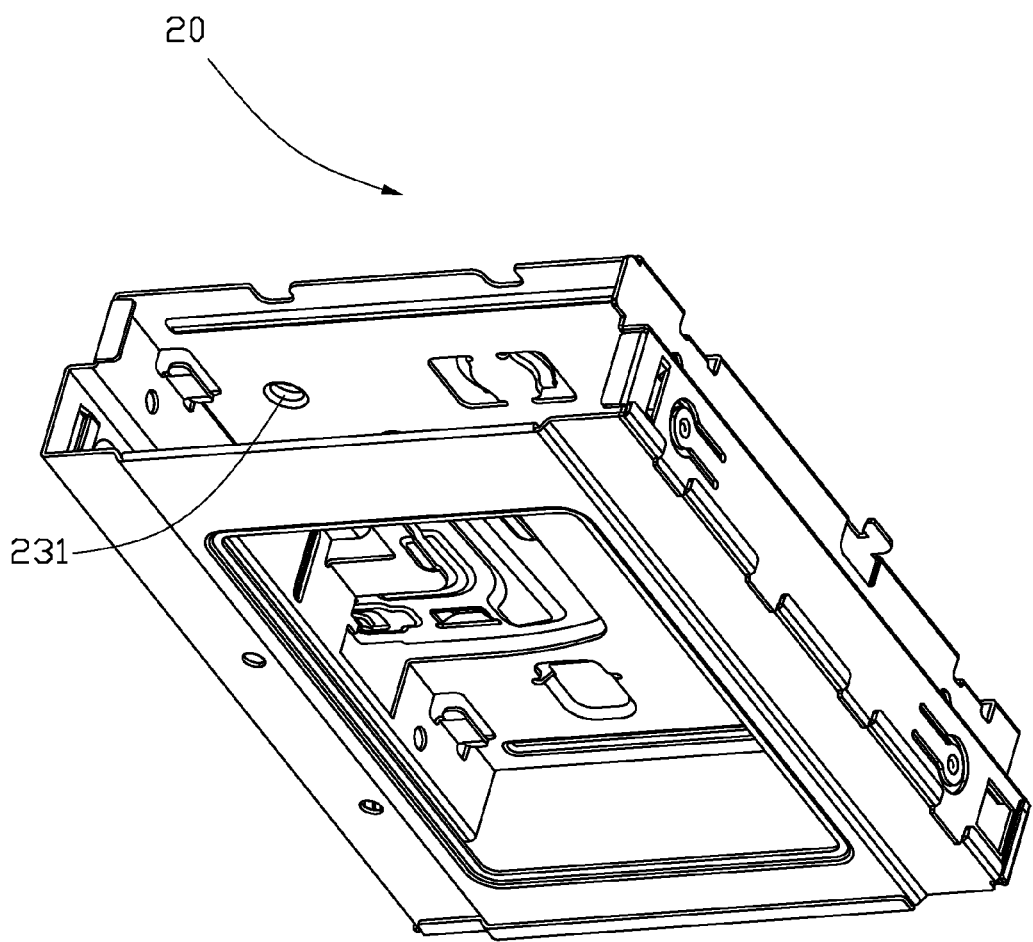
FIG. 2 is similar to FIG. 1, but viewed from another aspect.
Figure 3:
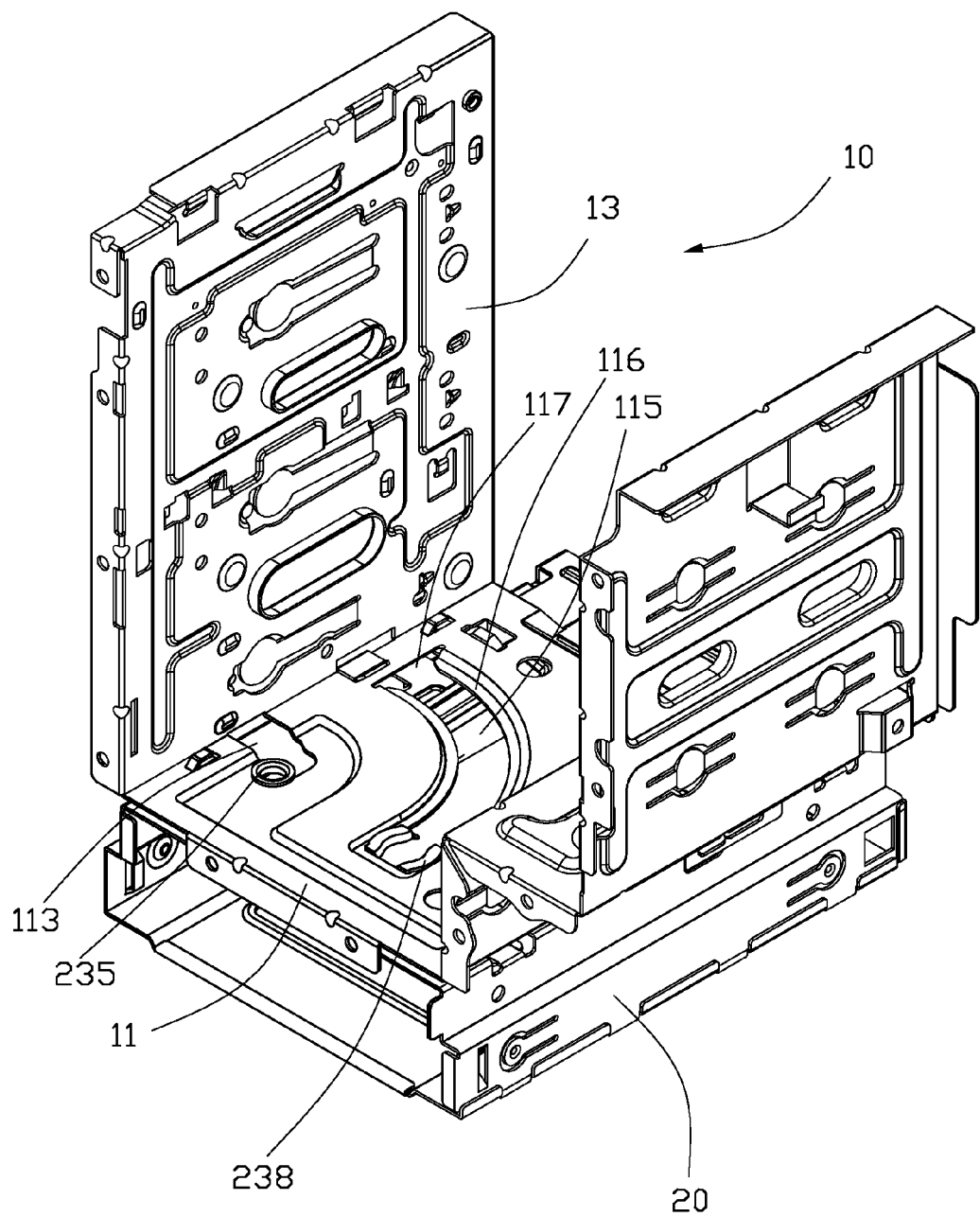
FIG. 3 is an isometric view of two drive brackets of an electronic apparatus.

Referring to FIGS. 1 to 3, an electronic apparatus in accordance with an embodiment of the present disclosure includes a first drive bracket 10 and a second drive bracket 20. The second drive bracket 20 is capable of being attached to the first drive bracket 10.

The first drive bracket 10 includes a bottom plate 11 and a pair of side plates 13, extending upwardly from opposite edges of the bottom plate 11. The bottom plate 11 defines a receiving groove 113 and an arc-shaped sliding groove 115. The receiving groove 113 extends to an edge of the bottom plate 11. Opposite edges surrounding the sliding groove 115 form a pair of arc-shaped support pieces 116 thereon. An end of the sliding groove 115 defines an opening 117, which communicates with the sliding groove 115.

The second drive bracket 20 includes a bottom wall 21, a top wall 23, and a pair of side walls 25 formed between the bottom wall 21 and top wall 23. A portion of the top wall 23 is stamped upwardly to form a through hole 231 and a knob 232. The knob 232 is protruded from a top side of the top wall 23. The knob 232 includes a neck portion 234 and a cap portion 235, connecting with the neck portion 234. The neck portion 234 is connected with edges of the through hole 231. The cap portion 235 extends outwardly from edges of the neck portion 234, and the cap portion 235 is thicker than the neck portion 234.

Another portion of the top wall 23 extends upwardly to form a pair of sliding members 236. Each sliding member 236 includes an upright portion 237 and a sliding portion 238 formed on a top edge of the upright portion 237. The upright portion 237 is substantial vertically connected on the top wall 23. The upright portion 237 is arc-shaped to be slidable in the sliding groove 115. The two sliding portions 238 of the two sliding members 236 extend in opposite directions.

Referring to FIG. 3, to assemble the second drive bracket 20 on the first drive bracket 10, the knob 232 of the second drive bracket 20 is aligned with the receiving groove 113. The sliding member 236 is aligned with the opening 117 of the sliding groove 115. Then, the neck portion 234 of the knob 232 is received in the receiving groove 113. The cap portion 235 engages a top side of the bottom plate 11. Simultaneously, the pair of sliding members 236 is engaged in the opening 117. The sliding portions 238 of the sliding members 236 engage the support pieces 116 of the first drive bracket 10. The sliding portions 28 also hang on the support pieces 116 to prevent the second drive bracket 20 from falling from the bottom plate 11 of the first drive bracket 10. The second drive bracket 20 rotates around the knob 232 to have the sliding portions 28 sliding on the support pieces 116 until the top wall 23 of the second drive bracket 20 aligns with the bottom plate 11 of the first drive bracket 10. Therefore, the second drive bracket 20 is attached on the first drive bracket 10 to accept additional drives.

Figure 4:
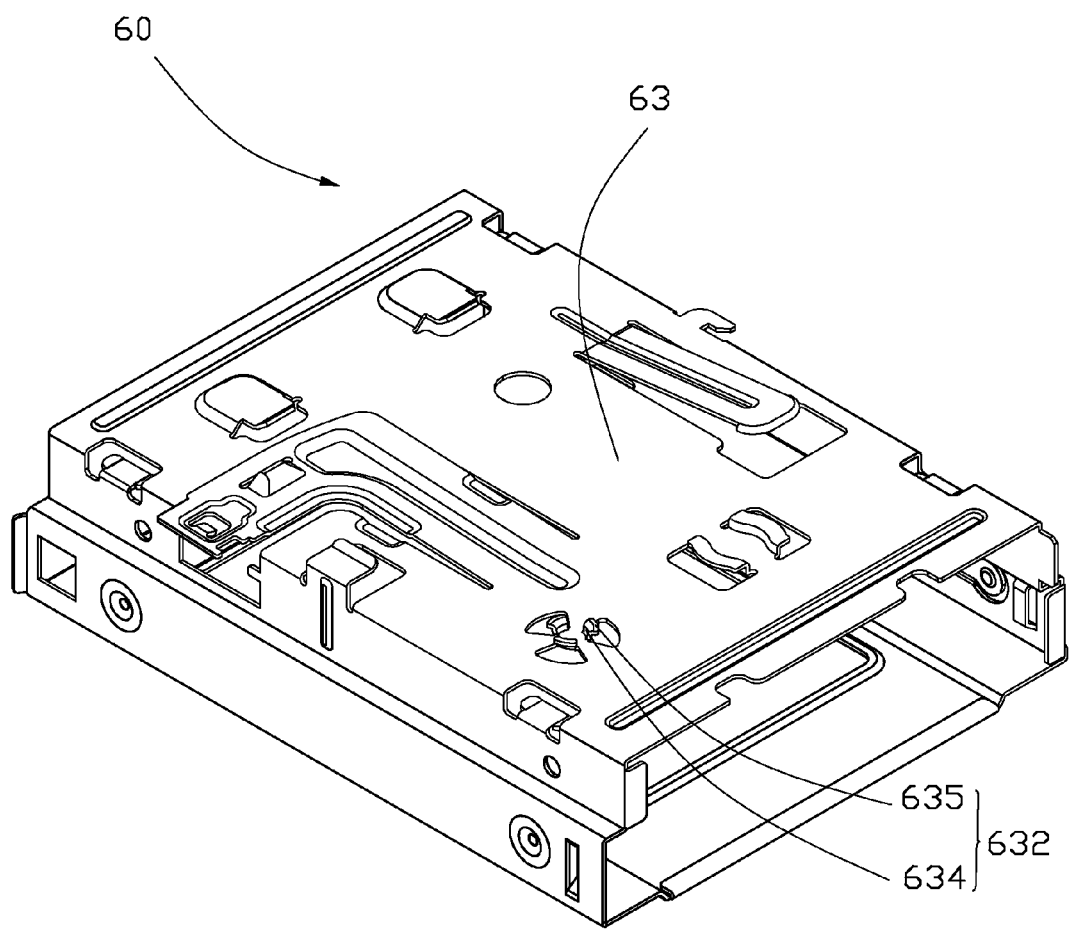
FIG. 4 is an isometric view of a drive bracket of an electronic apparatus in accordance with another embodiment.

Referring to FIG. 4, another embodiment of the second drive bracket is shown. The second drive bracket 60 of FIG. 4 includes a top wall 63. A portion of the top wall 63 extends upwardly to form three clasps 632. The three clasps 632 substantially define a circle. Each clasp 632 includes a connection portion 634 and an engaging portion 635. The connection portion 634 is substantial vertically connected on the top wall 63. A top portion of the connection portion 634 is deformed outward of the circle to form the engaging portion 635. When the second drive bracket 60 is mounted on the bottom plate 11 of the first drive bracket 10, the connection portions 634 of the three clasps 632 are received in the receiving groove 113, and the engaging portions 635 of the three clasps 632 engage the top side of the bottom plate 11. The three clasps 632 work as an axis for the second drive bracket 60.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An electronic apparatus, comprising:
   a first drive bracket comprising a bottom plate, and the bottom plate defining a receiving groove and an arc-shaped sliding groove; and a second drive bracket comprising a top wall, the top wall comprising a knob and at least one sliding member formed thereon; wherein the knob is received in the receiving groove to work as an axis, and the at least one sliding member is received in the sliding groove, and capable of sliding in the sliding groove to a mounted position; in the mounted position, the top wall of the second drive bracket is aligned with the bottom plate of the first drive bracket.

2. The electronic apparatus of claim 1, wherein the at least one sliding member comprises a upright portion connected the top wall and a sliding portion connected to a top edge of the upright portion, the upright portion is received in the sliding groove, and the sliding portion extends through the sliding groove and is located on a top side of the bottom plate.

3. The electronic apparatus of claim 2, wherein the at least one sliding member comprises two sliding members, and two sliding portions of the two sliding members extend in opposite directions.

4. The electronic apparatus of claim 3, wherein an end of the sliding groove defines an opening through which the sliding portions of the two sliding members extend.

5. The electronic apparatus of claim 3, wherein opposite edges surrounding the sliding groove forms a pair of support pieces on which the sliding portions of the two sliding members are capable of sliding.

6. The electronic apparatus of claim 2, wherein the upright portion is arc-shaped.

7. The electronic apparatus of claim 1, wherein the knob comprises a neck portion and a cap portion, the neck portion is received in the receiving groove, and the cap portion engages a top side of the bottom plate.

8. The electronic apparatus of claim 7, wherein the neck portion is connected with the top wall; the cap portion extends outwardly from edges of the neck portion, and the cap portion is thicker than the neck portion.

9. The electronic apparatus of claim 1, wherein the receiving groove extends to an edge of the bottom plate.

10. The electronic apparatus of claim 1, wherein the knob comprises a plurality of clasps, each clasp comprises a connection portion, connected to the top wall, and an engaging portion, bent from a top portion of corresponding connection portion, the connection portions define a circle to be received in the receiving groove, and the engaging portions engage a top side of the bottom plate.

11. An electronic apparatus, comprising:
a first drive bracket comprising a bottom plate, the bottom plate defining a sliding groove; and
a second drive bracket comprising a top wall, at least one sliding member formed on the top wall, the at least one sliding member comprising a upright portion connected on the top wall and a sliding portion formed on a top edge of the upright portion;
wherein the upright portion of the at least one sliding member is received in the sliding groove, and the sliding portion extends through the sliding groove to be located on a top side of the bottom plate; the bottom plate defines a receiving groove; the top wall comprises a knob, the knob comprises a neck portion and a cap portion, the neck portion is received in the receiving groove, and the cap portion engages a top side of the bottom plate.

12. The electronic apparatus of claim 11, wherein the at least one sliding member comprises two sliding members, and two sliding portions of the two sliding members extend in opposite directions.

13. The electronic apparatus of claim 12, wherein an end of the sliding groove defines an opening through which the sliding portions of the two sliding members extend.

14. The electronic apparatus of claim 12, wherein opposite edges surrounding the sliding groove forms a pair of support pieces on which the two sliding portions of two sliding members capable of sliding.

15. The electronic apparatus of claim 11, wherein the sliding groove is arc-shaped, and the upright portion is arc-shaped to fit with the sliding groove.

16. The electronic apparatus of claim 1, wherein the receiving groove extends to an edge of the bottom plate.

17. The electronic apparatus of claim 11, wherein the neck portion is connected with the top wall, the cap portion extends outwardly from edges of the neck portion, and the cap portion is thicker than the neck portion.

18. An electronic apparatus, comprising:
a first drive bracket comprising a bottom plate, and the bottom plate defining a receiving groove and an arc-shaped sliding groove; and
a second drive bracket comprising a top wall, the top wall comprising a plurality of clasps and at least one sliding member formed thereon, each of the plurality of clasps comprising a connection portion connected to the top wall;
wherein the connection portions of the plurality of clasps are aligned in a circle to be received in the receiving groove to function as an axis, the at least one sliding member is received in the sliding groove, and the top wall of the second drive bracket is configured to rotate with respect to the bottom plate of the first drive bracket around the axis with the at least one sliding member sliding in the sliding groove.

19. The electronic apparatus of claim 18, wherein each of the plurality of clasps further comprises an engaging portion bent from a top portion of each of the connection portion, and the engaging portion engages a top side of the bottom plate when the connection portion is received in the receiving groove.

20. The electronic apparatus of claim 18, wherein the top wall of the second drive bracket is configured to rotate to a mounted position; in the mounted position, the top wall of the second drive bracket is aligned with the bottom plate of the first drive bracket.

* * * * *